United States Patent
Ha et al.

(10) Patent No.: US 10,692,390 B2
(45) Date of Patent: Jun. 23, 2020

(54) TABLETOP SYSTEM FOR INTUITIVE GUIDANCE IN AUGMENTED REALITY REMOTE VIDEO COMMUNICATION ENVIRONMENT

(71) Applicant: VIRNECT inc., Naju-si (KR)

(72) Inventors: Tae Jin Ha, Naju-si (KR); Jea In Kim, Naju-si (KR); Noh Young Park, Naju-si (KR)

(73) Assignee: VIRNECT INC., Naju-si (KR)

( * ) Notice: Subject to any disclaimer, the term of this patent is extended or adjusted under 35 U.S.C. 154(b) by 0 days.

(21) Appl. No.: 16/531,039

(22) Filed: Aug. 3, 2019

(65) Prior Publication Data

US 2020/0043354 A1 Feb. 6, 2020

(30) Foreign Application Priority Data

Aug. 3, 2018 (KR) .................. 10-2018-0090591

(51) Int. Cl.
*G06F 3/041* (2006.01)
*G09B 5/02* (2006.01)
(Continued)

(52) U.S. Cl.
CPC ........... *G09B 5/02* (2013.01); *G02B 27/0172* (2013.01); *G06F 3/011* (2013.01); *G06F 3/04883* (2013.01); *G06K 9/00201* (2013.01); *G06K 9/00375* (2013.01); *G06K 9/4652* (2013.01); *G06T 7/20* (2013.01); *H04N 7/147* (2013.01); *H04N 13/204* (2018.05); *G02B 2027/0138* (2013.01); *G02B 2027/0178* (2013.01); *G06F 3/0482* (2013.01); *G06F 2203/04803* (2013.01); *G06T 2207/30196* (2013.01); *G09B 19/24* (2013.01)

(58) Field of Classification Search
CPC .... G09B 5/02; H04N 13/204; H02B 27/0172; G06F 3/011
USPC .......................................................... 345/173
See application file for complete search history.

(56) References Cited

U.S. PATENT DOCUMENTS

2012/0131488 A1* 5/2012 Karlsson ............. G06F 3/04883
715/771
2012/0249587 A1* 10/2012 Anderson ........... G06F 3/04895
345/633

(Continued)

FOREIGN PATENT DOCUMENTS

KR 1020050100778 A 10/2005
KR 1020090087332 A 8/2009
(Continued)

*Primary Examiner* — Jonathan M Blancha
(74) *Attorney, Agent, or Firm* — STIP Law Group, LLC

(57) ABSTRACT

A tabletop system for intuitive guidance in an augmented reality remote video communication environment comprises augmented reality glasses worn by a field operator, equipped with a video camera that obtains on-site, actual image information, and displaying an augmented guide on a transparent display; a tabletop receiving the actual image information from the augmented reality glasses and displaying the actual image information on a touchscreen, detecting hand motion information and instructions indicated by a remote expert in an upper space of the touchscreen and transmitting the hand motion information and instructions to the augmented reality glasses as the augmented guide.

4 Claims, 11 Drawing Sheets

(51) Int. Cl.

| | | |
|---|---|---|
| *H04N 7/14* | (2006.01) | |
| *G06F 3/01* | (2006.01) | |
| *G06K 9/00* | (2006.01) | |
| *G06K 9/46* | (2006.01) | |
| *G06F 3/0488* | (2013.01) | |
| *H04N 13/204* | (2018.01) | |
| *G06T 7/20* | (2017.01) | |
| *G02B 27/01* | (2006.01) | |
| *G09B 19/24* | (2006.01) | |
| *G06F 3/0482* | (2013.01) | |

(56) References Cited

U.S. PATENT DOCUMENTS

| | | | | |
|---|---|---|---|---|
| 2014/0002421 A1* | 1/2014 | Lee | ............ | G06F 3/03545 |
| | | | | 345/179 |
| 2014/0241575 A1* | 8/2014 | Lee | ............ | G06K 9/00671 |
| | | | | 382/103 |
| 2014/0380252 A1* | 12/2014 | Tanaka | ............ | G06F 3/0421 |
| | | | | 715/863 |
| 2015/0160854 A1* | 6/2015 | Hosaka | ............ | G06F 3/04883 |
| | | | | 715/863 |
| 2016/0378258 A1* | 12/2016 | Lyons | ............ | G06F 3/0488 |
| | | | | 345/175 |
| 2017/0192493 A1* | 7/2017 | Ofek | ............ | G06F 3/005 |

FOREIGN PATENT DOCUMENTS

| | | |
|---|---|---|
| KR | 1020130099317 A | 9/2013 |
| KR | 1020140108426 A | 9/2014 |

\* cited by examiner

TABLETOP SYSTEM FOR INTUITIVE GUIDANCE IN AUGMENTED REALITY REMOTE VIDEO COMMUNICATION ENVIRONMENT

CROSS REFERENCE TO RELATED APPLICATION(S)

This application claims the priority to Korean Patent Application No. 10-2018-0090591, filed on Aug. 3, 2018, which is all hereby incorporated by reference in its entirety.

BACKGROUND

Technical Field

The present invention relates to a tabletop system and, more particularly, to a tabletop system for intuitive guidance in an augmented reality remote video communication environment.

Related Art

Generally, power plants are composed of various facilities interconnected with each other over a large area. Since plants usually deal with high temperature, high pressure processes, if a serious accident such as fire or explosion occurs, the extent of damage is huge, which makes them classified as high risk industry.

Accordingly, plant vendors are active in introducing a method for continuously monitoring various risk factors that may cause damage in the plants by installing safety sensors (for example, pressure, leakage, or vibration sensors) at primary facilities.

In other words, a function is required, which collects, processes, analyzes, stores, and displays a large amount of data, by which plant facilities may be always monitored in real-time and quickly located, and the best decision may be made as quickly as possible at the time of failure and abnormal status of the plant facilities.

In particular, power plants such as those dealing with nuclear power, gas power, compound thermal power, hydro power, and wind power have to regularly perform preventive maintenance for major facilities and take a prompt action in the event of a serious situation such as radioactive spills or emergency stoppage of the power plants.

However, decision making for dealing with such a serious situation has conventionally been dependent on collection and analysis of highly fragmented data, or tremendous time and costs are needed for collecting and analyzing a large amount of data. Moreover, since only skilled experts are allowed to repair and inspect the corresponding facilities, it takes a great deal of time and money to nurture skilled experts. As a result, at the occurrence of emergency and disaster due to abnormal status of plant facilities, prompt and correct actions and countermeasures may not be taken, which leads to a problem that causes enormous economic and social costs.

In this regards, there is demand for development of a system capable of supporting works effectively at a remote site for the companies operating highly expensive, key facilities such as substation, power plant, machinery, aviation, railroad, semiconductor facilities.

The Korean public patent No. 10-2005-0100778 ("Relay from the spot system and its method", hereinafter, reference 1) discloses an on-site relay system capable of capturing a scene in real-time and transmitting video and audio information to user terminals and a central control situation room via a high-speed communication network; controlling field equipment remotely; providing excellent transmission quality; producing live casting at low costs; and controlling and taking actions against a situation in the field promptly.

However, in the case of reference 1, when the central control situation room that has confirmed live casting data sends a specific instruction to the remote site, the command is relayed through a text transmitter or Trunked Radio System (TRS), which may cause a problem that an operator misinterprets the instruction sent in a text message and takes actions in an incorrect way.

PRIOR ART REFERENCES

Patent References (Patent reference 1) KR10-2005-0100778 A

SUMMARY OF THE INVENTION

The present invention has been made in an effort to solve the technical problem above and provides a tabletop system capable of remotely supporting the work of a field operator wearing augmented reality glasses in a prompt and correct way.

Also, the present invention provides a tabletop system capable of displaying augmented task information in real-time before the operator's eyes, thereby supporting prompt decision making and proper responses.

Also, to remotely support a work in a prompt and correct manner, the present invention provides a tabletop system that transmits motion information of hands of a remote expert and motion information of tools manipulated by the remote expert in real-time to the smart glasses (augmented reality glasses) worn by a field operator; and thereby supports the field operator to intuitively understand task details.

According to one embodiment of the present invention to solve the technical problem above, a tabletop system comprises augmented reality glasses worn by a field operator, equipped with a video camera that obtains on-site, actual image information, and displaying an augmented guide on a transparent display; and a tabletop receiving the actual image information from the augmented reality glasses and displaying the received actual image information on a touchscreen, and detecting hand motion information and instructions indicated by a remote expert in an upper space of the touchscreen and transmitting the hand motion information and instructions to the augmented reality glasses as the augmented guide.

Also, according to another embodiment of the present invention, a tabletop system comprises augmented reality glasses worn by a field operator, equipped with a video camera that obtains on-site, actual image information, and displaying an augmented reality guide on a transparent display; a tabletop displaying the actual image information on a touchscreen, detecting hand motion information and instructions indicated by a remote expert in an upper space of the touchscreen, and transmitting the detected hand motion information and instructions to a server; and the server relaying data between the augmented reality glasses and the tabletop, matching coordinates of the augmented guide corresponding to the hand motion information and instructions so that the augmented guide is displayed on the corresponding position of a physical object in the actual image information, and transmitting the matched coordinates to the augmented reality glasses in real-time.

Also, the tabletop of the present invention recognizes each working tool, office tool (pen or eraser), and hand of the remote expert by using three-dimensional depth information.

Also, the tabletop of the present invention recognizes the hand of the remote expert by using color information and recognizes each working tool and each office tool (pen or eraser) by using three-dimensional depth information.

Also, the tabletop of the present invention comprises the touchscreen displaying the actual image information and displaying a menu area and a working area separately; and a three-dimensional camera disposed in one side of the touchscreen and detecting motion information in an upper space of the touchscreen.

Also, the tabletop of the present invention automatically switches to a drawing guide mode when each office tool (pen or eraser) is recognized, transmits moving coordinates of the office tool (pen or eraser) moving on the touchscreen, and when any one of the hand of the remote expert and working tools is recognized, automatically switches to an action guide mode to transmit motion video of the hand of the remote expert and motion video of the working tool.

DESCRIPTION OF EXEMPLARY EMBODIMENTS

In what follows, embodiments of the present invention will be described in detail with reference to appended drawings so that those skilled in the art to which the present invention belongs may readily apply the technical principles of the present invention.

Figure 1:
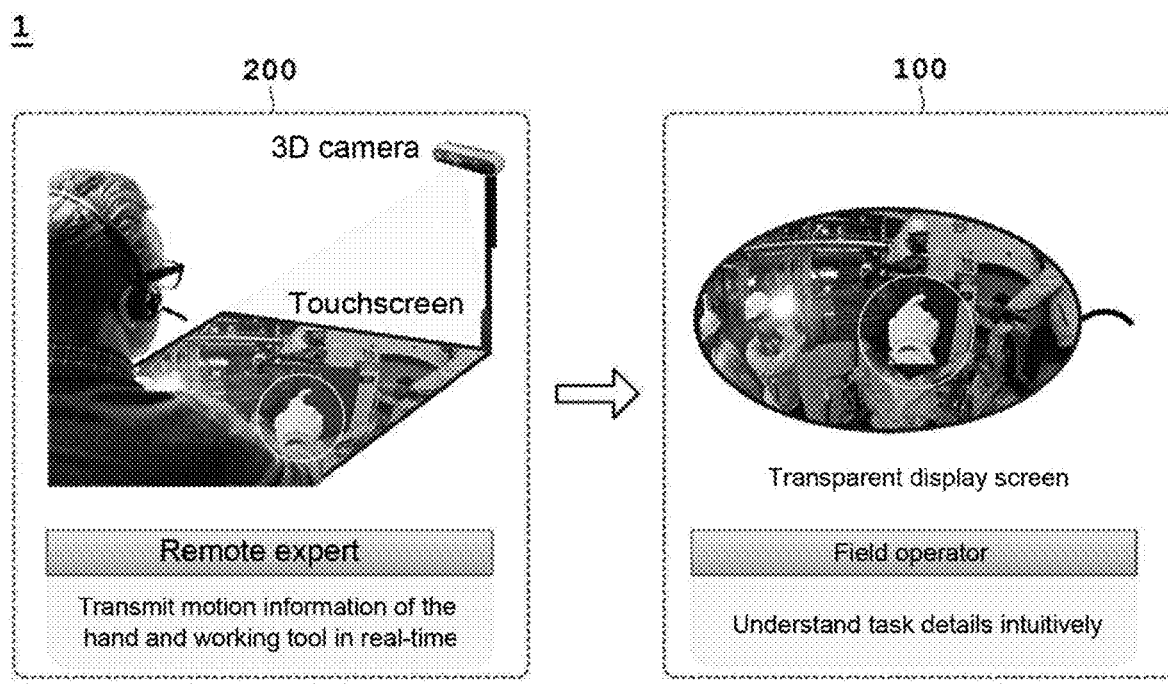
FIG. 1 illustrates a tabletop system 1 according to an embodiment of the present invention.
Figure 2:
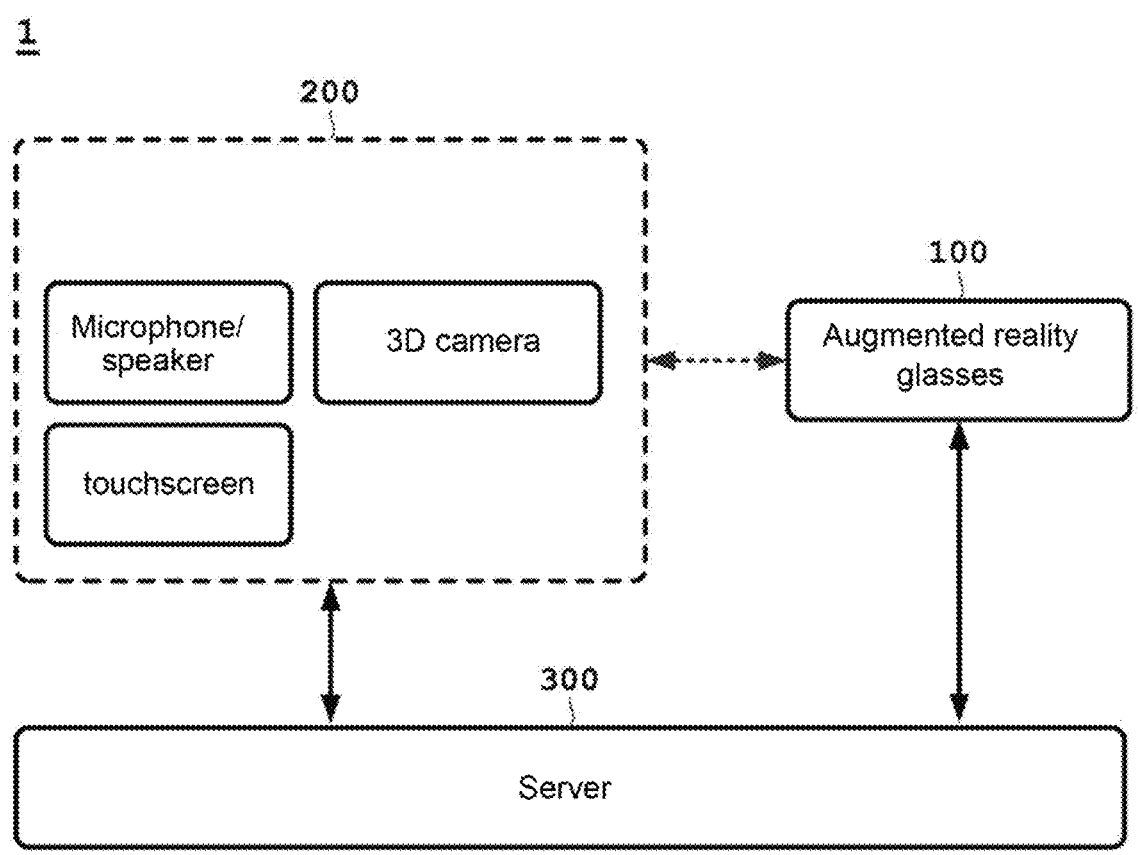
FIG. 2 illustrates a structure of the tabletop system 1 of FIG. 1.

FIG. 1 illustrates a tabletop system 1 according to an embodiment of the present invention, and FIG. 2 illustrates a structure of the tabletop system 1 of FIG. 1.

The tabletop system 1 according to the present embodiment shows only a simplified structure to clearly describe the technical principles of the proposed invention.

Referring to FIGS. 1 and 2, the tabletop system 1 comprises augmented reality glasses 100, a tabletop 200, and a server 300.

A detailed structure and key operations of the tabletop system 1 above are given as follows.

The augmented reality glasses 100, worn by a field operator, are equipped with a video camera that captures actual image information in the workspace and display an augmented guide on a transparent display.

The tabletop 200 receives actual image information from the augmented reality glasses 100, displays the received video information on a touchscreen, detects hand motion information and instructions indicated by a remote expert in an upper space of the touchscreen, and transmits the hand motion information and instructions to the augmented reality glasses 100 as an augmented guide.

In other words, while checking actual image information captured and transmitted by the field operator via the augmented reality glasses 100, the remote expert may select a physical object from the actual image information and provide hand motion information and instructions as an augmented guide directly to the field operator's eyes, thereby improving work efficiency.

The field operator wears the augmented reality glasses 100 and transmits on-site, actual image information within his or her field of view in real-time.

Since the remote expert directly checks the actual image information and provides hand motion information and instructions as an augmented guide, the field operator may continue his or her work while directly checking the augmented guide displayed on the augmented reality glasses 100.

In other words, through the transparent display of the augmented reality glasses 100, the field operator may proceed with his or her work while checking not only an actual, real-world object but also the augmented guide allocated to the physical object simultaneously.

Therefore, since the field of view of the field operator may be displayed practically in the same extent as the field of view of the remote expert and instructions may be transmitted to each other, efficient communication is made possible and work efficiency is increased.

Meanwhile, although FIG. 1 illustrates an example where data are transmitted directly between the augmented reality glasses 100 and the tabletop 200, data may be transmitted between the augmented reality glasses 100 and the tabletop 200 via the server 300 as shown in FIG. 2.

Referring again to FIG. 2, the augmented reality glasses 100 are structured to be worn by a field operator, to be equipped with a video camera for capturing on-site, actual image information, and to display an augmented guide on a transparent display.

The tabletop 200 displays actual image information on a touchscreen, where hand motion information and instructions indicated by a remote expert are detected in the upper space of the touchscreen and transmitted to the server 300.

In other words, the tabletop 200 is structured to comprise a touchscreen that displays actual image information, which is divided into a menu area and a working area; a three-dimensional camera disposed in one side of the touchscreen and detecting motion information in an upper space of the touchscreen; a microphone that records and transmits the voice of a remote expert; and a speaker that outputs the voice of a field operator. It is preferable that the microphone and the speaker are assembled into a single body to be worn over the head by the remote expert in the form of a headset.

Since the control circuit, wired or wireless communication circuit, and so on of the tabletop 200 do not belong to the technical scope of the present invention, descriptions thereof will be omitted.

The server 300 relays data between the augmented reality glasses 100 and the tabletop 200; matches coordinates of an augmented guide corresponding to the hand motion information and instructions so that the augmented guide is displayed on the corresponding position of a physical object in the actual image information; and transmits the matched coordinates to the augmented reality glasses 100 in real-time.

In other words, while checking actual image information captured and transmitted by the field operator via the augmented reality glasses 100, the remote expert may select a physical object from the actual image information and provide hand motion information and instructions as an augmented guide directly to the field of view of the field operator, thereby improving work efficiency.

The field operator wears the augmented reality glasses 100 and transmits on-site, actual image information within his or her field of view in real-time.

Since the remote expert directly checks the actual image information and provides hand motion information and instructions as an augmented guide, the field operator may continue his or her work while directly checking the augmented guide displayed on the augmented reality glasses 100.

In other words, through the transparent display of the augmented reality glasses 100, the field operator may proceed with his or her work while checking not only an actual, real-world object but also the augmented guide allocated to the physical object simultaneously.

Therefore, since the field of view of the field operator may be displayed practically in the same extent as the field of view of the remote expert and instructions may be transmitted to each other, efficient communication is made possible and work efficiency is increased.

Figure 3:
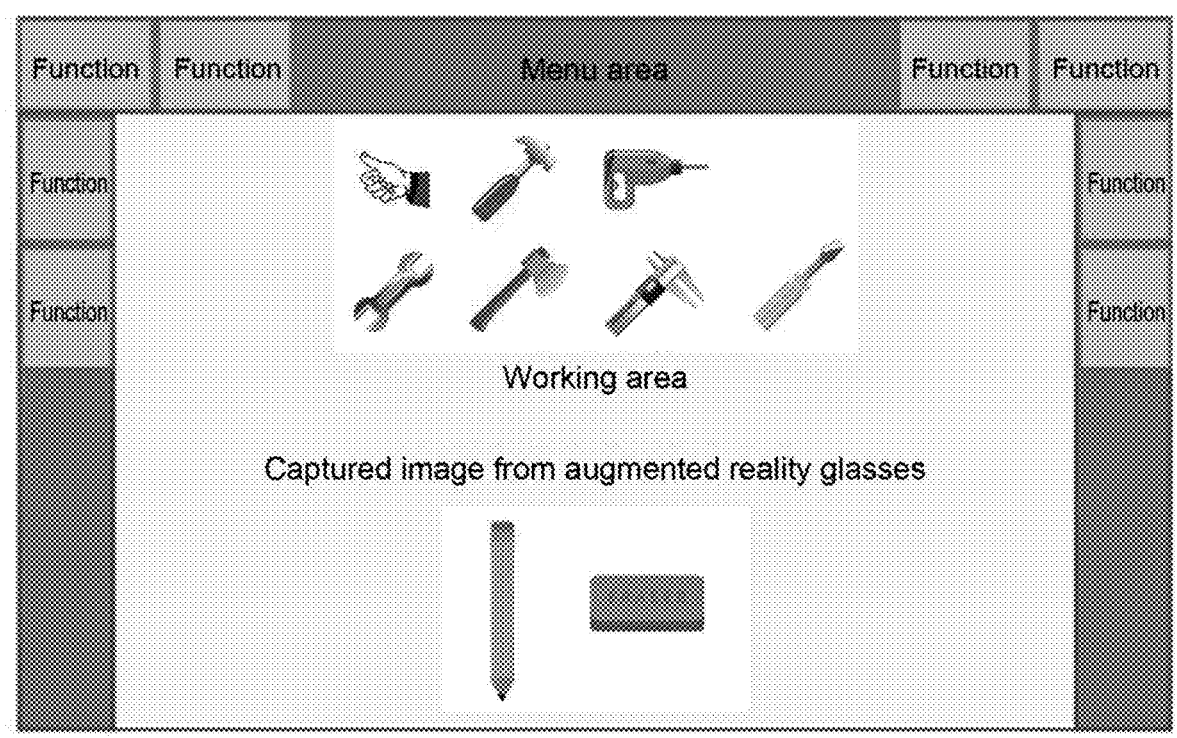
FIG. 3 illustrates a layout of the screen of the tabletop 200.

FIG. 3 illustrates a layout of the screen of the tabletop 200.

Referring to FIG. 3, the touchscreen of the tabletop 200 is divided into a menu area and a working area.

Since the menu area is used by a remote expert to select a specific function of the tabletop 200, the menu area is not displayed for a field operator.

The menu area arranges menus at the side and upper part of the tabletop 200 so that the menus may be accessed easily by hand. An automated evaluation of usability automatically determines button sizes and positions of the menus that are readily selected, where frequently used functions are disposed close to the hand, allowing the user to quickly select the functions.

It should be noted that positions of frequently used functions may be automatically adjusted so that the functions are disposed close to the hand of a user. In other words, if the user's hand stays at a particular position for a predetermined time period, frequently used menus may be automatically moved in order of position distance to the user's hand.

The working area is an area where actual image information transmitted by a field operator is displayed and at the same time, an effective area from which a three-dimensional camera detects objects. When a remote expert draws instructions on the working area by using a pen or an eraser, the instructions are displayed on a transparent display of the field operator as an augmented guide.

At this time, when the remote expert draws instructions around a selected physical object by using a pen, the instructions are also displayed on the transparent display of the field operator by being drawn around the physical object as an augmented guide.

Meanwhile, when each tool (pen or eraser) is recognized, the tabletop 200 is automatically switched to a drawing guide mode and transmits moving coordinates of each tool (pen or eraser) that moves on the touchscreen.

Also, if either of the hand of the remote expert and the tool is recognized, the tabletop 200 is automatically switched to an action guide mode and transmits hand motion video or motion video of the tool.

In other words, after determining the motion of the remote expert (user), namely, after determining whether the hand is used, office tool (pen or eraser) is used, or working tool is used, the tabletop 200 is automatically switched to the drawing guide mode or action guide mode.

By default, in the action guide mode, all of the motion of the remote expert is transmitted to the augmented reality glasses 100 in real-time while, in the drawing guide mode, only the instructions desired by the remote expert are transmitted selectively to the augmented reality glasses 100.

In other words, when unnecessary instructions and information are transmitted to the augmented reality glasses 100, the field operator wearing the augmented reality glasses 100 may get confused; therefore, it may be configured so that only the necessary information is selected and transmitted. In the drawing guide mode, too, the remote expert may choose to transmit only a pre-recorded video rather than a real-time video.

Figure 4:
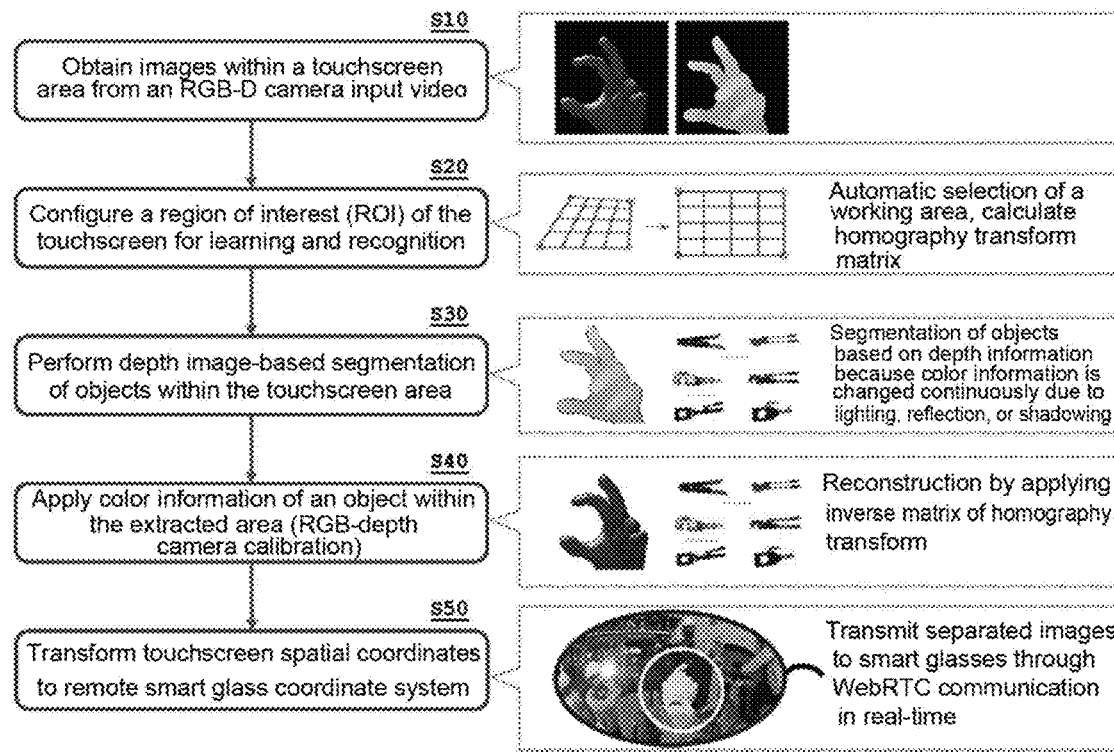
FIG. 4 illustrates a method for detecting an object at the tabletop 200.

FIG. 4 illustrates a method for detecting an object at the tabletop 200.

Referring to FIG. 4, the three-dimensional (3D) camera of the tabletop 200 is configured to detect 3D motion in the upper space of the touchscreen.

By default, the 3D depth information is used to identify each working tool, each office tool (pen or eraser), and the hand of a remote expert and to store the motion data continuously.

Also, the 3D camera of the tabletop 200 may be configured to identify the hand of the remote expert by using color information and identify each working tool and each office tool (pen or eraser) by using the 3D depth information, after which the motion data are stored continuously.

In other words, a non-rigid object such as the hand is first identified, and then a procedure for re-confirming whether the identified object is a preconfigured object by using 3D depth information may be performed. Also, for a rigid object such as the working tool or office tool, a procedure for detecting whether the identified object is a preconfigured object by using 3D depth information may be performed.

In other words, target objects to be recognized are learned offline beforehand, and then a recognition process is performed to determine whether a separated object is a user's hand, office tool (pen or eraser), or working tool. A rigid object such as an office tool (pen or eraser) or working tool, which does not change its external shape, may be recognized through 3D surface matching based on 3D depth data.

Also, a non-rigid object such as hand may be configured to be recognized by using color information. It is preferable that color information of the hand is configured to be learned automatically by detecting the hand implicitly, for example, when a start button is pressed at the initial system execution.

A method for detecting an object shown in FIG. 4 is performed as follows.

First, a process of obtaining images of the upper space of the touchscreen among input images from the 3D camera is performed S10.

Next, a process of configuring a further specific region of interest (ROI) of the touchscreen for learning and recognition purposes is performed S20.

Next, based on the depth information of the captured image, a process of separating an object is performed S30.

Next, a process of applying color information of an object within the extracted region of interest is performed S40.

Finally, a process of transforming spatial coordinates of the upper part of the touchscreen into the coordinate system of the augmented reality glasses 100 and displaying an augmented guide on a transparent display of the augmented reality glasses 100 is performed S50.

Figure 5:
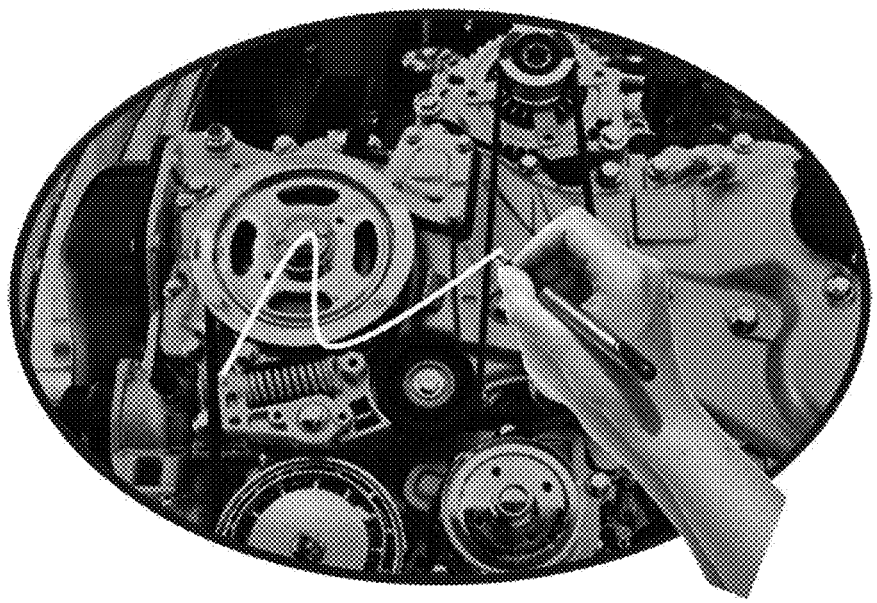
FIG. 5 illustrates a first screen displayed on the tabletop 200 and augmented reality glasses 100.

FIG. 5 illustrates a first screen displayed on the tabletop 200 and augmented reality glasses 100.

Referring to FIG. 5, if a pen is located within a working area, the tabletop 200 is configured to automatically switch to a drawing mode, track moving coordinates of the pen on the touchscreen, and transmit the coordinates only when the calculated distance between two consecutive coordinates is larger than a predetermined distance. If an eraser object is recognized, the drawing on the touchscreen is deleted.

The pen is defined as a stylus pen of the touchscreen, and the color for the pen is made to be different from that of the hand so that whether the pen is located within a working area may be determined easily. If the pen is located within the working area and the pen tip touches the touchscreen, the coordinates of the corresponding position are transmitted to the server and augmented reality glasses (smart glasses).

When the drawing is to be deleted, a tangible object such as one in the form of an eraser is made to be recognized so that a memo on the screen may be removed quickly. In other words, an eraser object is recognized, and the values of drawing pixels belonging to the area of the eraser object are deleted.

Figure 6:
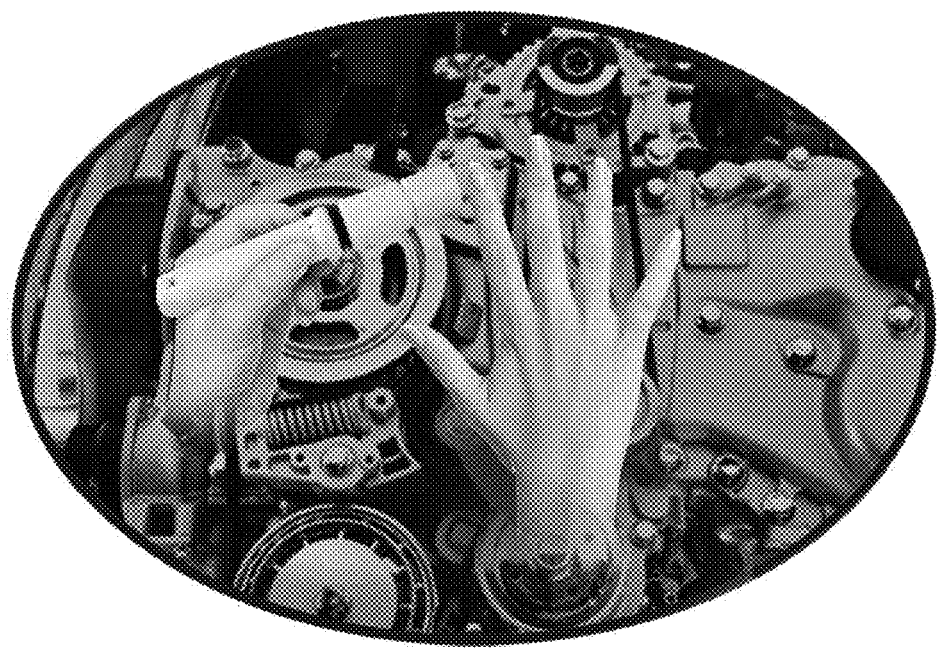
FIG. 6 illustrates a second screen displayed on the tabletop 200 and augmented reality glasses 100.

FIG. 6 illustrates a second screen displayed on the tabletop 200 and augmented reality glasses 100.

Referring to FIG. 6, if a bare hand or tool is recognized from 3D depth data, the tabletop 200 is automatically switched to the action guide mode. Intuitiveness is improved as the hand motion of an expert and how the expert handles the tool are transmitted directly, where the separated, corresponding object area is stored in an image buffer, the data of which is transmitted based on WebRTC.

Therefore, intuitiveness is improved as a field operator is enabled to see the motion of the expert's hand and the way the expert handles a tool as if indicated directly, and the separated, corresponding object area may be stored in an image buffer to be transmitted to the augmented reality glasses.

Figure 7:
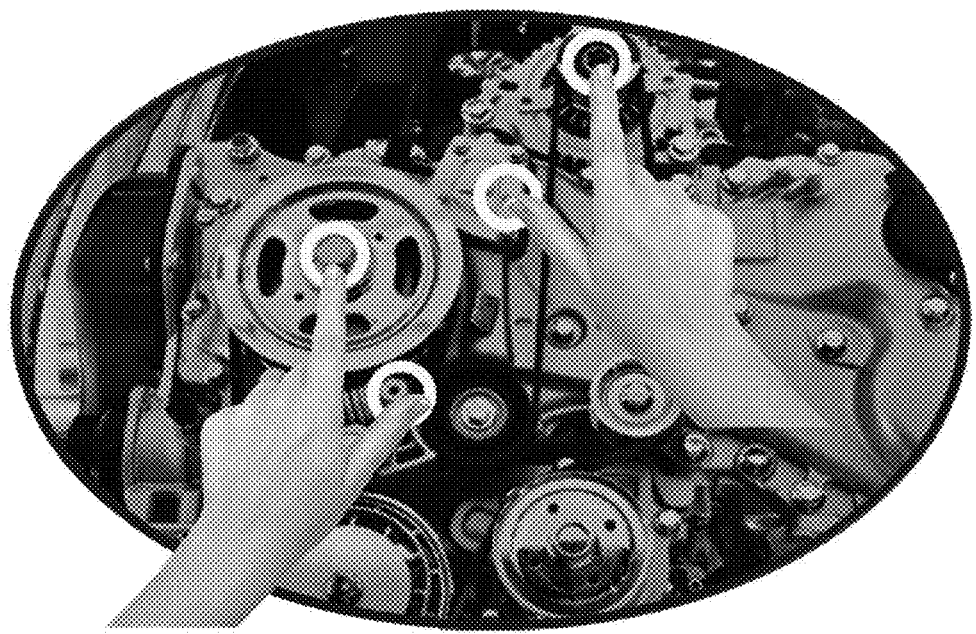
FIG. 7 illustrates a third screen displayed on the tabletop 200 and augmented reality glasses 100.

FIG. 7 illustrates a third screen displayed on the tabletop 200 and augmented reality glasses 100.

Referring to FIG. 7, the remote expert may touch the touchscreen for pointing without having to find the position of a mouse. Coordinates of the touchscreen at which the fingertip or pen tip touches are detected and transmitted in real-time.

Figure 8:
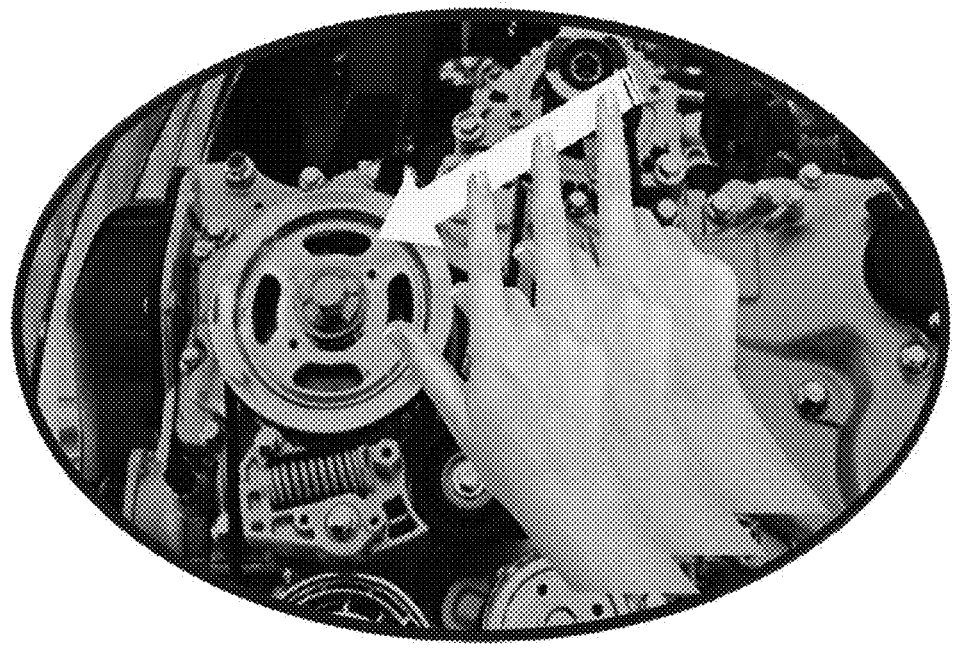
FIG. 8 illustrates a fourth screen displayed on the tabletop 200 and augmented reality glasses 100.

FIG. 8 illustrates a fourth screen displayed on the tabletop 200 and augmented reality glasses 100.

Referring to FIG. 8, hand gesture may be recognized based on the touchscreen coordinates and 3D depth data. The trajectory of 2D coordinates of the fingertip moving on the touchscreen are stored in time order, and the 2D time series coordinates are transmitted based on WebRTC. At this time, only when the trajectory is longer than a predetermined length and exhibits a meaningful direction, an arrow is configured to be increased along the corresponding direction. An arrow object is also increased simultaneously at the augmented reality glasses worn by a field operator.

Figure 9:
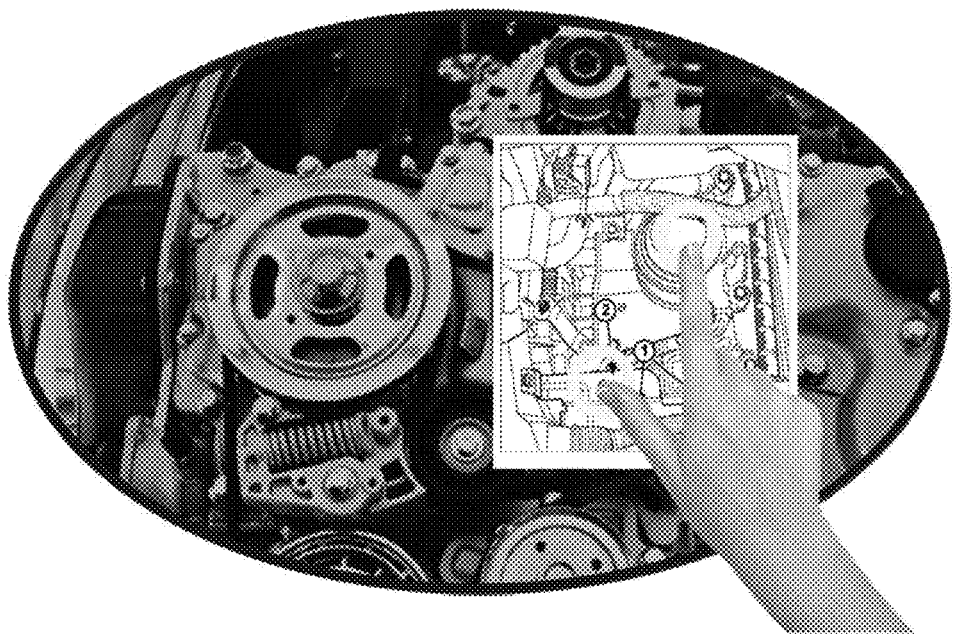
FIG. 9 illustrates a fifth screen displayed on the tabletop 200 and augmented reality glasses 100.

FIG. 9 illustrates a fifth screen displayed on the tabletop 200 and augmented reality glasses 100.

Referring to FIG. 9, the remote expert may change the position of a displayed image in a prompt and intuitive manner by using the hand or pen on the touchscreen. The remote expert may use his or her two hands or two fingers to change the image size and rotate the image. The values of image manipulation (2D translation, 2D rotation, and 2D scaling) are transmitted based on WebRTC.

Figure 10:
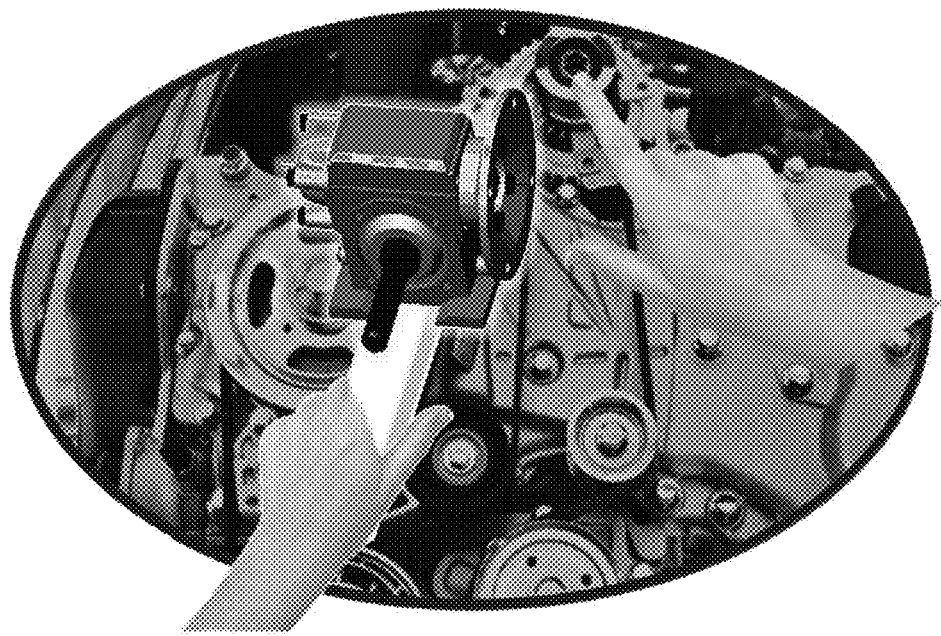
FIG. 10 illustrates a sixth screen displayed on the tabletop 200 and augmented reality glasses 100.

FIG. 10 illustrates a sixth screen displayed on the tabletop 200 and augmented reality glasses 100.

Referring to FIG. 10, an image of a physical object selected by the remote expert is displayed on the touchscreen of the tabletop 200 in the form of a 3D augmented model, and the 3D augmented model may change its position in association with the motion of the remote expert's hand.

The remote expert may change the position of the 3D augmented model in a prompt and intuitive manner on the touchscreen by using his or her hand or by using a pen. In other words, the remote expert may change the position, size, and rotation of a 3D model by using his or her hand in a prompt and intuitive manner. At this time, the values of model manipulation (3D translation, 3D rotation, and 3D scaling) are transmitted based on WebRTC.

In other words, a video in which a remote expert selects a physical object (component) from the tabletop 200, augments the selected object as a 3D model, and manipulates manually the process of assembling and disassembling the corresponding component may be transmitted in real-time to the augmented reality glasses 100 of a field operator to be used as an intuitive augmented guide.

It should be noted that an actual keyboard or a virtual keyboard may be used in association with the touchscreen of the tabletop 200. If an actual keyboard is located within a working area, the keyboard is recognized, and the tabletop 200 is automatically switched to a text guide mode, where, at this time, the keyboard and hand area are not transmitted to the augmented reality glasses 100.

In another method, a virtual keyboard may be operated by software that places the keyboard on the touchscreen only when needed and closes the keyboard from the touchscreen after being used.

Meanwhile, if all of the working screens guided by the remote expert are transmitted to the augmented reality glasses (smart glasses), the field operator may be confused. In order to prevent this problem, a behavioral intention of the remote expert is recognized to change a guide menu selectively, where only the information required for guidance is transmitted to the augmented reality glasses (smart glasses).

For example, if a pen appears in a working area and touches the touchscreen, the tabletop is immediately switched to the drawing mode, but in the case of loading a file required for transmitting an image, since it is not necessary to show a file loading dialog screen to the field operator, the file loading dialog screen is not transmitted.

Figure 11:
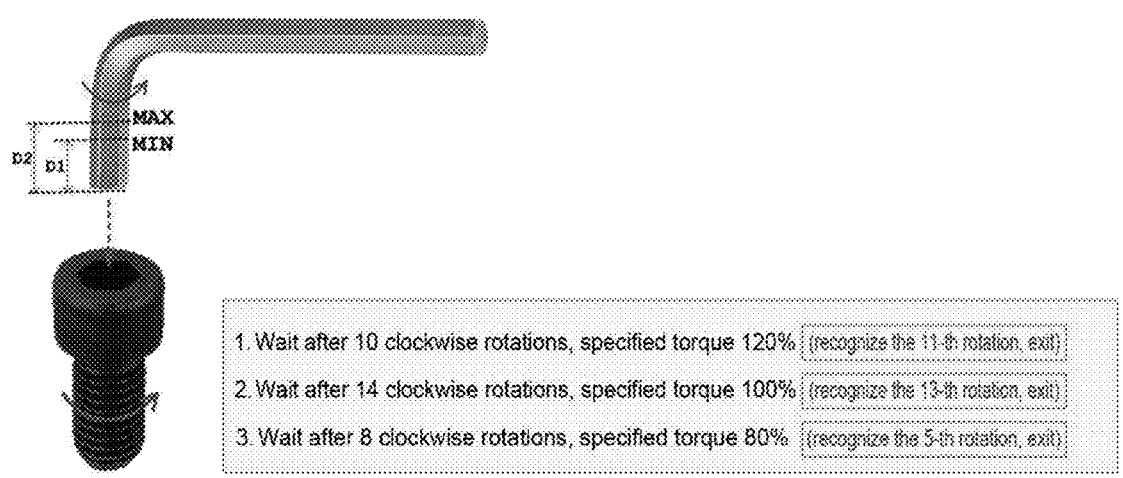
FIG. 11 illustrates an augmented guide displayed on the augmented reality glasses 100.

FIG. 11 illustrates an augmented guide displayed on the augmented reality glasses 100.

FIG. 11 illustrates an example in which an image of a physical object selected by a remote expert is displayed as a 3D augmented model on the touchscreen of the tabletop 200 of FIG. 10, and the position of the 3D augmented model is changed in association with the motion of the remote expert's hand.

In other words, if the remote expert selects a screw (physical object) from actual image information on the touchscreen, the screw is displayed as a 3D augmented model.

At this time, if the remote expert holds a hexagonal wrench to tighten the screw over the augmented screw and rotates the hexagonal wrench, a video of the augmented screw being rotated along the rotational direction is displayed. At this time, arrows showing the rotational direction of the hexagonal wrench and the rotational direction of the screw may be displayed automatically.

At this time, if the remote expert selects a virtual hexagonal wrench rather than a real one, the virtual hexagonal wrench is also configured to be augmented simultaneously and rotated according to the instructions of the user's hand.

If a virtual hexagonal wrench is used, the augmented virtual hexagonal wrench and screw may be configured to move according to a voice command of the remote expert, namely, a voice command such as "clockwise rotation", "counterclockwise rotation", "screw release", "screw tightening", or "3D rotation".

Meanwhile, if the remote expert instructs a specific way of tightening the screw by voice, the remote expert's voice is recognized and displayed as text on the touchscreen, and the number of rotations of the hexagonal wrench or screw is also visually detected and displayed. At this time, the remote expert may directly enter text to instruct a specific way of tightening the screw or give instructions in parallel with speech recognition.

At this time, since all of the images displayed on the touchscreen except for the hand image are displayed simultaneously on a transparent display of augmented reality glasses, a field operator wearing the augmented reality glasses may get a feeling that the remote expert is giving work instructions right next to the field operator, so accurate work guidance is made possible.

Although the remote expert may instruct the field operator by transmitting an augmented guide in real-time, for the purpose of sequential guidance, the remote expert may check his or her instructions beforehand and transmit necessary videos selectively.

Meanwhile, when the field operator actually inserts a hexagonal wrench to a screw and tightens the screw, the number of rotations of the hexagonal wrench or screw may be visually detected and displayed, and the insertion depth of the hexagonal wrench may also be visually detected and displayed. In other words, since the maximum insertion depth and minimum insertion depth are automatically detected and displayed on the screen, the field operator may visually recognize the tightening depth of the hexagonal wrench more accurately.

At this time, since technical specifications such as the length information of the hexagonal wrench and fastening hole of the screw are pre-stored in the server 300, the server 300 may detect the tightening depth based on the pre-stored information.

It should be noted that the server 300 always transform the coordinates of the transparent display of the augmented reality glasses 100 to match the coordinates of the touchscreen of the tabletop 200 so that the field of view of the field operator becomes the same as the field of view of the remote expert.

Figure 12A:
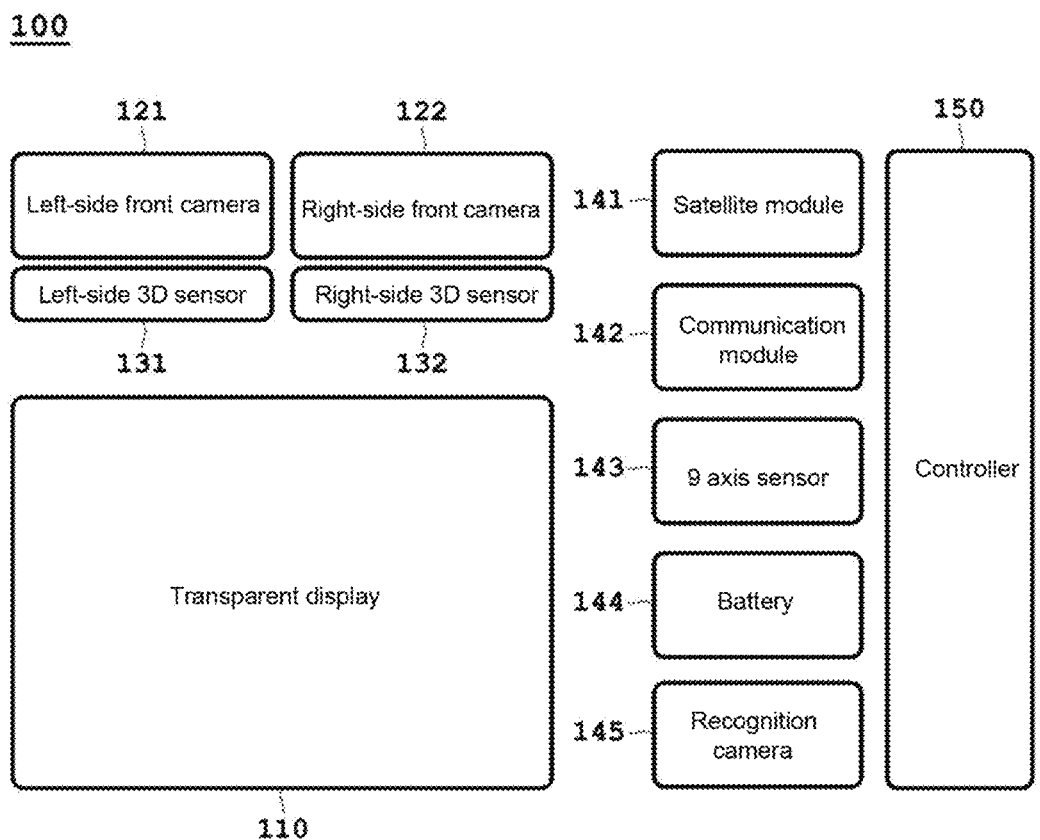
FIG. 12a illustrates a structure of the augmented reality glasses 100 of the tabletop system 1.
Figure 12B:
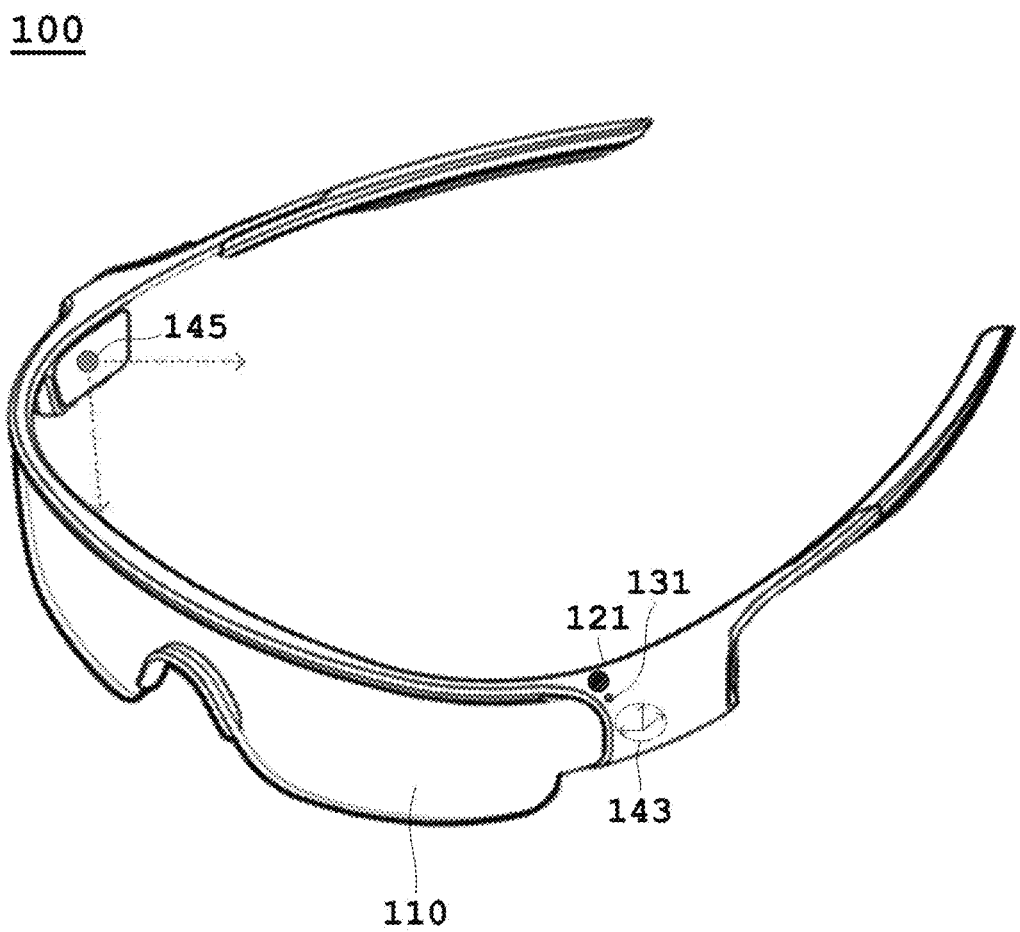
FIG. 12b illustrates augmented reality glasses 100.

FIG. 12a illustrates a structure of the augmented reality glasses 100 of the tabletop system 1, and FIG. 12b illustrates augmented reality glasses 100.

Referring to FIGS. 12a and 12b, the augmented reality glasses 100 comprise a transparent display 110, left-side front camera 121, right-side front camera 122, left-side 3D sensor 131, right-side 3D sensor 132, satellite module 141, communication module 142, 9 axis sensor 143, battery 144, recognition camera 145, and controller 150.

The transparent display 110 is a display made of a transparent material and forms the lens of the augmented reality glasses 100. Therefore, while looking at the front area, the user may check a physical and virtual objects simultaneously. At this time, the transparent display 110 may be installed over the whole or part of the lens.

The left-side front camera 121 is installed at the left-side of the glasses and obtains actual image information at the front. Also, the right-side front camera 122 is installed at the right-side of the glasses and obtains actual image information at the front.

The left-side 3D sensor 131 and the right-side 3D sensor 132 operates so as to capture 3D images of the front in conjunction with the left-side camera 121 and the right-side camera 122. In other words, the captured 3D images may be stored in an internal memory or transmitted to the server 300. It should be noted that depending on embodiments, only one front camera and only one 3D sensor may be disposed to obtain actual image information. It is preferable that the front camera is configured to capture images from both of the infrared and visible regions.

The satellite module 141 may be included to obtain satellite position information, and the communication module 142 may be equipped with a Wi-Fi communication module, Bluetooth communication module, or Broadband (3G, 4G, LTE) communication module.

The 9 axis sensor 143 is so called because measurement is performed along a total of 9 axes comprising 3 axis acceleration outputs, 3 axis inertial outputs, and 3 axis geomagnetic outputs, where temperature sensors may be added for temperature compensation. The 9 axis sensor 143 may detect the forward-looking direction, movement direction, and inclination of the user by sensing 3D motion of the augmented reality glasses 100.

The battery 144 may be configured to supply operation power to the augmented reality glasses 100, which may be composed of rechargeable Li-ion battery or pseudo capacitor.

It should be noted that the battery 144 may be composed of a plurality of pseudo capacitors, where pseudo capacitors provide an advantage over conventional capacitors because they use a two-dimensional oxidation-reduction reaction at the electrodes and thereby have a relatively long battery life.

The recognition camera 145 detects eye motion of the user, looking direction of the eyes, and size change of the eyes. It is most preferable that the recognition cameras 145 are disposed at the left and right-side respectively, but they may be disposed only at one side.

By default, the recognition camera 145 captures a scene in the direction along which the user's eyes are located but may be configured to capture the image of the user's eyes reflected from the transparent display 110 and detect the eye motion, looking direction of the eyes, and size change of the eyes.

The controller 150 controls the operation of the transparent display 110, left-side front camera 121, right-side front camera 122, left-side 3D sensor 131, right-side 3D sensor 132, satellite module 141, communication module 142, 9 axis sensor 143, battery 144, and recognition camera 145.

Meanwhile, the controller 150 may be configured to charge at least one of a plurality of pseudo capacitors selectively according to the magnitude of charging power. The charging method will be described in detail as follows.

Suppose three pseudo capacitors are disposed, namely first pseudo capacitor, second pseudo capacitor, and third pseudo capacitor. At this time, it is assumed that charging capacity of the first pseudo capacitor is the largest, charging capacity of the second pseudo capacitor is smaller than that of the first pseudo capacitor, and charging capacity of the third pseudo capacitor is even smaller than that of the second pseudo capacitor.

Detecting charged amounts of the first, second, and third pseudo capacitors, the controller 150 supplies operation power in a descending order of charged amount.

For example, suppose the charged amount of the first pseudo capacitor is 60%, that of the second pseudo capacitor is 70%, and that of the third pseudo capacitor is 80%.

Then the controller 150 first supplies power to the third pseudo capacitor. If the charged amount reaches 40%, the controller 150 stops supplying power to the third pseudo capacitor and supplies power to the second pseudo capacitor. Similarly, if the charged amount of the second pseudo capacitor reaches 40%, the controller 150 stops supplying power to the second pseudo capacitor and supplies power to the first pseudo capacitor.

Also, when the charged amounts of the first to the third pseudo capacitors are all less than 40%, the controller 150 supplies operation power by connecting the first to the third pseudo capacitors in parallel.

Figure 13:
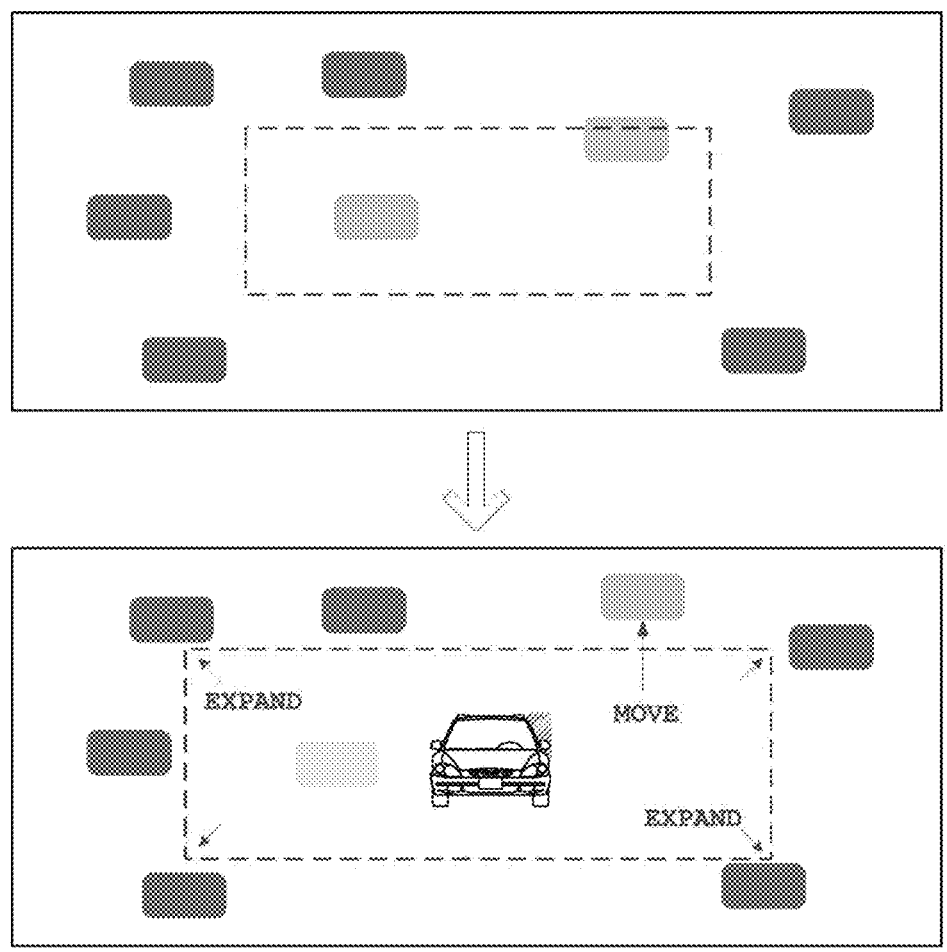
FIG. 13 illustrates a safety mode of augmented reality glasses 100.

FIG. 13 illustrates a safety mode of augmented reality glasses 100.

The augmented reality glasses 100 may be set to the safety mode for the safety of a field operator.

When the safety mode is set, the augmented reality glasses 100 detect a physical object that approaches the user through the front cameras 121, 123. In other words, the augmented reality glasses 100 may detect a physical object approaching fast toward the user, such as a car or a bicycle that may be harmful to the user and display the emergency situation on the transparent display 110.

Referring to FIG. 13, a screen shows that the user (field operator) is looking at the front area, where a rectangular area indicated by a dotted line in the middle of the screen is defined as a highly attentive area. At this time, the front cameras 121, 122 may detect a physical object approaching fast (with a speed faster than a predetermined value) toward the user, such as a car or a bicycle that may be harmful to the user (field operator).

Then the size of the highly attentive area is expanded automatically, and a virtual object displayed on the screen is automatically moved to the outward direction or transparency of the virtual object is further reinforced so that the user may easily recognize the fast approaching physical object.

In proportion to (in direct proportion to or in square proportion to) the speed of a physical object approaching the user (field operator), the size of the highly attentive area, transparency of the virtual object, and movement speed of the virtual object moving to the outward direction may be automatically determined.

Also, when the recognition camera 145 detects the looking direction of the eyes of the user (field operator), the highly attentive area is automatically moved according to the direction of the eyes. In other words, if the eyes of the user (field operator) gaze to the right, the highly attentive area is moved to the right. At this time, if the front cameras 121, 123 detect that a physical object approaching—from the front—toward the user, such as a car or a bicycle that may be harmful to the user (field operator), a safety operation as described above is performed over the highly attentive area, but the highly attentive area is automatically moved to the front of the user.

In other words, the highly attentive area may be configured to be automatically moved toward a physical object approaching fast toward the user.

It should be noted that since the recognition camera 145 is capable of detecting movement of the eyes of the user, gazing direction of the eyes, and size change of the eyes, an operation command may be instructed based on the size change of the eyes.

For example, virtual information corresponding to lower level information is gradually displayed each time the user opens his or her eyes wide for a predetermined time period while virtual information corresponding to upper level information is gradually displayed each time the user narrows his or her eyes for a predetermined time period. Also, to improve a command recognition rate of the recognition camera 145, artificial eyebrows for instructions may be attached to the eyebrows of the user. The artificial eyebrows for instructions may be coated with reflective paint that reflects infrared light in a predetermined range, and the recognition camera 145 may be configured to recognize the infrared light, thereby improving the command recognition rate.

Figure 14:
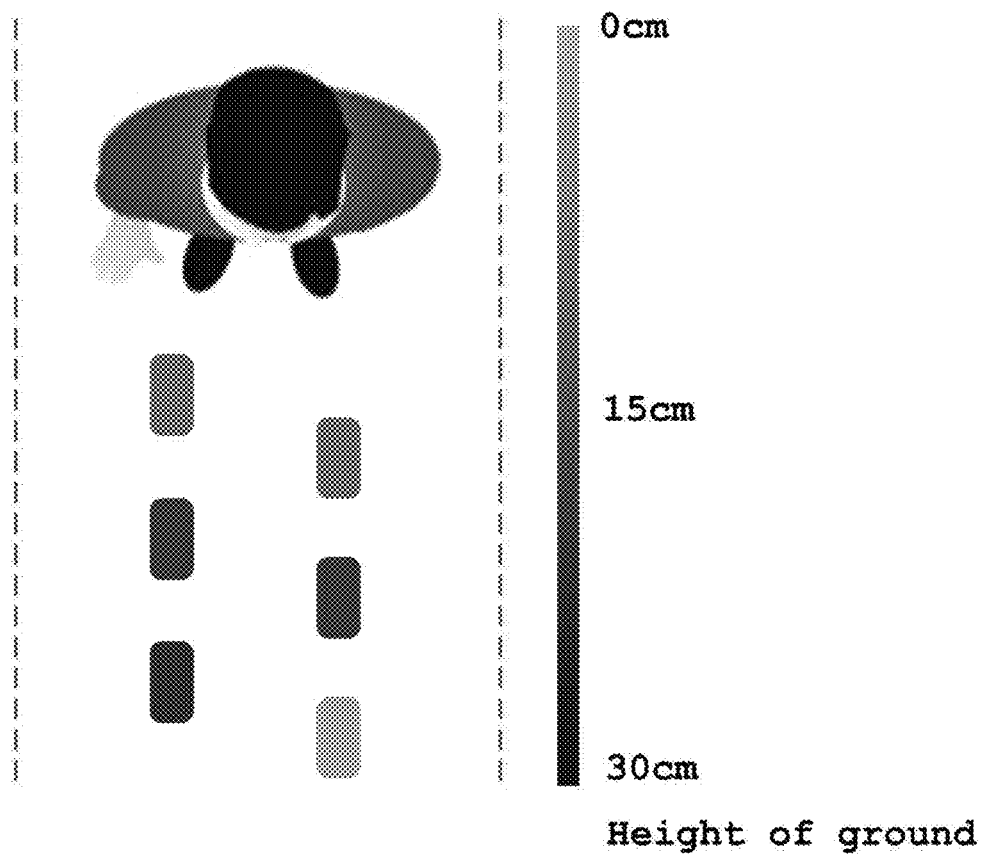
FIG. 14 illustrates an overhead view mode of augmented reality glasses 100.

FIG. 14 illustrates an overhead view mode of augmented reality glasses 100.

Referring to FIG. 14, the overhead view mode refers to a mode where the scene is captured above the head of the user, and a synthesized image is displayed on the transparent display 110.

In other words, although not shown in the figure, a plurality of view cameras capable of capturing images in the infrared and visible region may be additionally arranged along the frame of the augmented reality glasses 100. Therefore, images captured by a plurality of view cameras may be synthesized together and provided to the eyes of the user, where a trajectory of footprints along which the user moves safely may be displayed not only during the daytime but also at nighttime, in particular. At this time, the footprint trajectory may be displayed with height information of the ground with respect to a predetermined previous position, thereby helping the user move more safely.

A tabletop system according to an embodiment of the present invention may remotely support the work of a field operator wearing augmented reality glasses in a prompt and correct way.

The tabletop system may intuitively instruct task details by transmitting action information indicated by the hand of an expert and motion information of an office tool and a working tool to the augmented reality glasses worn by a field operator in real-time.

When the proposed tabletop is used, temporary work vacancy of an expert may be reduced as travel periods are reduced, and travel time for visiting a site, travel expenses, and an accident risk for maintenance trips may be reduced effectively.

As described above, it is apparent for those skilled in the art that the present invention may be embodied in other specific forms without changing the technical principles or essential characteristics of the present invention. Therefore, the embodiments described above should be regarded as being illustrative rather than restrictive in every aspect. The technical scope of the present invention should be determined by the appended claims given below rather than the detailed descriptions above, and it should be understood that the implications and scope of the appended claims and all of the modifications or modified forms that are derived from an equivalent concept of the present invention belong to the technical scope of the present invention.

A tabletop system according to an embodiment of the present invention may remotely support the work of a field operator wearing augmented reality glasses in a prompt and correct way.

The tabletop system may intuitively instruct task details by transmitting action information indicated by the hand of an expert and motion information of an office tool and a working tool to the augmented reality glasses worn by a field operator in real-time.

When the proposed tabletop is used, temporary work vacancy of an expert may be reduced as travel periods are reduced, and travel time for visiting a site, travel expenses, and an accident risk for maintenance trips may be reduced effectively.

What is claimed is:

1. A tabletop system, comprising:
   augmented reality glasses worn by a field operator, equipped with a video camera that obtains on-site, actual image information, and displaying an augmented guide on a transparent display;
   a tabletop displaying the actual image information, detecting hand motion information and instructions indicated by a remote expert in an upper space of the touchscreen and transmitting the hand motion information and instructions to a server; and
   the server relaying data between the augmented reality glasses and the tabletop, matching coordinates of the augmented guide corresponding to the hand motion information and instructions so that the augmented guide is displayed on the corresponding position of a physical object in the actual image information, and transmitting the matched coordinates to the augmented reality glasses in real-time,
   wherein the tabletop automatically switches to a drawing guide mode when a pen or an eraser is recognized, transmits moving coordinates of the pen or eraser moving on the touchscreen, and when any one of the hand of the remote expert and working tools is recognized, automatically switches to an action guide mode to transmit motion video of the hand of the remote expert and motion video of the working tool, and the tabletop recognizes each working tool, pen, eraser, and the hand of the remote expert by using 3D depth information.

2. The tabletop system of claim 1, wherein the tabletop comprises the touchscreen displaying the actual image information, which is divided into a menu area and a working area; and
   a 3D camera disposed in one side of the touchscreen and detecting hand motion information instructed by the remote expert in an upper space of the touchscreen.

3. A tabletop system, comprising:
   augmented reality glasses worn by a field operator, equipped with a video camera that obtains on-site, actual image information, and displaying an augmented guide on a transparent display;
   a tabletop displaying the actual image information, detecting hand motion information and instructions indicated by a remote expert in an upper space of the touchscreen and transmitting the hand motion information and instructions to a server; and
   the server relaying data between the augmented reality glasses and the tabletop, matching coordinates of the augmented guide corresponding to the hand motion information and instructions so that the augmented guide is displayed on the corresponding position of a physical object in the actual image information, and transmitting the matched coordinates to the augmented reality glasses in real-time,
   wherein the tabletop automatically switches to a drawing guide mode when a pen or an eraser is recognized, transmits moving coordinates of the pen or eraser moving on the touchscreen, and when any one of the hand of the remote expert and working tools is recognized, automatically switches to an action guide mode to transmit motion video of the hand of the remote expert and motion video of the working tool, and
   the tabletop recognizes the hand of the remote expert by using color information and recognizes each working tool, pen, and eraser by using 3D depth information.

4. The tabletop system of claim 3, wherein the tabletop comprises the touchscreen displaying the actual image information, which is divided into a menu area and a working area;
   and
   a 3D camera disposed in one side of the touchscreen and detecting hand motion information instructed by the remote expert in an upper space of the touchscreen.

* * * * *